United States Patent Office 3,314,763
Patented Apr. 18, 1967

3,314,763
PROCESS FOR OBTAINING NON-LUMPING SULPHUR
Georges Molinet, Pau, and Georges Durand, Mourenx-Ville-Nouvelle, France, assignors to Societe Nationale des Petroles d'Aquitaine, Paris, France
No Drawing. Filed Oct. 22, 1964, Ser. No. 405,833
Claims priority, application France, Oct. 28, 1963, 951,968
5 Claims. (Cl. 23—224)

The present invention relates to a process for obtaining sulphur as non-lumping (non-caking) powder; it is also concerned with new anti-lumping agents which permit this result to be achieved; in addition, the invention covers the new industrial product formed by the non-lumping sulphur powder, prepared according to the process hereinafter described.

It is known that powdered sulphur has a tendency to form lumps during its storage, that is to say, to coagulate so as to form lumps of widely variable dimensions, the presence of which is harmful to the use of said powder. Agricultural and industrial uses do in fact require a readily-flowing sulphur; such a powder is prepared, according to the known art, by the sulphur having added thereto a fairly large proportion of mineral compounds, such as silica, talcum or magnesium carbonate. However, even if this known treatment avoids the lump formation, it jeopardises at the same time the purity of the sulphur, and this may present disadvantages.

The new process in accordance with the invention, on the other hand, makes it possible to obtain a fine sulphur powder which in practice no longer has the tendency to form lumps, while maintaining a high degree of purity. Thus, the sulphur powders according to the invention can be kept for months in a heap or in superimposed sacks without there being any formation of hard lumps; these powders may in addition have a sulphur content higher than 99% and even up to 99.8% or higher. Another advantage of the invention resides in that the treatment thereof, when it is applied to sulphur in the molten state, leads to a solid product which is capable of subsequent grinding to a high degree of fineness with ease. On the other hand, the treatment in accordance with the invention makes it possible to have a fine sulphur powder without any toxic or harmful ingredient and without any particular odour or colour. The invention also provides an economic advantage, because it can be achieved at lowest possible expense.

The process in accordance with the invention consists in homogeneously mixing with the sulphur a small quantity of an organic acid and/or a corresponding nitrile, the molecule of which contains at least 6 carbon atoms. In other words, the anti-lumping effect is applied by organic compounds carrying an electronegative group, such as for example —COOH, —SO₃H and/or —CN for a total number of carbon atoms equal to or larger than 6.

According to one preferred form of the invention, the organic acid or the nitrile being used is selected from those of which the number of carbon atoms is equal to or greater than 12. Furthermore, the organic acids and nitriles which are of most particular interest are those which have the property of lowering to a greater or lesser degree the interfacial tension between water and oil. Consequently, it is acids such as oleic acid, resinic acid, lauric acid and naphthenic acid, and also their sulphonated derivatives, which are preferred to the acids such as decanoic acid, stearic acid, arachidic acid, benzoic acid or benzene-sulphonic acid.

According to another feature of the invention, there are preferably used organic acids or nitriles which boil in the region of 150° C. or better still above this temperature.

The anti-lumping agents according to the invention may be liquid or solid; among the solids, there are preferred those of which the melting temperature is above 120° C., unless they are soluble in the molten sulphur, which has advantages for the particular embodiment which consists in adding the anti-lumping agent to the molten sulphur, this being a form of the invention to which reference will be made later.

For the same reason, it is advisable to use organic acids and/or nitriles having a thermal stability sufficient so as not to be subject to decomposition at 150° C. for a period of the order of about 30 minutes.

As anti-lumping agents according to the invention, it is possible to employ different fatty acids, aliphatic sulphonic acids, cyclo paraffinic acids such as naphthenic acid which is optionally sulphonated, aromatic acids, preferably carrying a fairly long aliphatic chain on the nucleus, sulphonated aromatic acids, etc., and the nitriles corresponding to these acids.

It is thus possible, as non-limiting examples, to use with varying efficiency the following acids: caproic, caprylic, capric, lauric, oleic, ricinoleic, linoleic, linolenic, stearic, palmitic, abietic and other resinic acids, dehydroabietic acid, tall oil acids, benzene-sulphonic acid, dodecyl-phenyl-sulphonic acid, oleyl-phenyl-sulphonic acid, naphthenic acid and the substituted derivatives of these acids. Similarly, the corresponding nitriles can be used, particularly nitriles of oleic, lauric, abietic and other acids. Generally the most suitable acids have 6 to 20 carbon atoms in their molecule.

The proportion of anti-lumping agent according to the invention which is sufficient to obtain the desired result is generally between 0.01% and 1% by weight, related to the sulphur. The desired effect is most frequently obtained with 0.05% to 0.5% and it is scarcely improved by increasing the quantity of added agent. In the very practical particular case where resinic acids and non-saturated fatty acids are used, the optimum proportions range between 0.1 and 0.3%. There is nothing to prevent the addition of quantities larger than 1% when a high degree of purity of the sulphur is not required.

The anti-lumping agent can be incorporated into the sulphur in various ways which are known per se and at different stages during the preparation of the sulphur powder.

Thus, it can be intimately mixed with the powder itself, or even with the sulphur which is to be ground with a view to preparing a fine powder.

One particularly advantageous embodiment of the invention consists in incorporating the anti-lumping agent into the molten sulphur in such a manner as to form a solution or even a perfectly homogeneous suspension in the mass of this metalloid. It is then found that, on cooling, the sulphur crystallises into larger and more friable crystals, which are easily crushed into a very fine powder which is protected against subsequent agglomeration by the presence of the anti-lumping agent.

Since it is necessary in this form of the invention to operate above the melting point of the sulphur, the molten mass in practice is kept between 125° and 150° C. and usually between 130° and 140° C. during the mixing operation, in order that the anti-lumping agent which is introduced can be well dispersed. It would of course be possible to heat to a higher temperature if the dissolving of a particular organic acid and/or nitrile required this.

Experience shows that very satisfactory results are obtained with a suitable though moderate agitation of the molten sulphur after the addition of one or more anti-lumping agents according to the invention. For example, with a blade-type stirrer device, speeds of 100 to 1000 r.p.m. for periods of half a minute to 30 minutes have made it possible to obtain a thoroughly homogeneous incorporation of many of the products mentioned above. According to the volume of sulphur to be treated and depending on the nature of the anti-lumping agent, the type of mixer and the temperatures which are chosen, these speeds and durations can vary, but in practice their respective values are usually of the order of 200 to 500 r.p.m. and 5 to 15 minutes. It is desirable to effect the mixing more rapidly when the agent employed is more volatile and/or sensitive to the action of heat.

One convenient method of procedure consists of the agent in the liquid state being injected into the molten sulphur, for example, directly into a conduit carrying the liquid sulphur.

In carrying out the process according to the invention, it is desirable to eliminate from the sulphur the hydrogen sulphide which might be found therein and which would be liable to exert a harmful influence on the crystallisation and the behaviour of the sulphur during storage. The same may moreover apply as regards other impurities and it is always desirable to eliminate them as far as possible.

In the course of work carried out within the scope of the invention regarding the efficiency of different substances as anti-lumping agents, the following test has been adopted as standard for determining the efficiency. Using samples of sulphur to which the agent to be studied has been added, a compressibility measurement was carried out, this consisting in determining the pressure necessary to produce the crushing of a 5 g. sulphur tablet with a section of 5 cm.$^2$, moulded at a pressure of 100 kg./cm.$^2$ for 5 minutes. The sulphur intended for the formation of the tablets is crushed and screened beforehand; the tablet is made with the granulometric fraction comprising the particles with dimensions smaller than 0.063 mm., which have been dried at 40° C. for 2 hours.

The untreated sulphur, which has the usual lumping tendency, gives a compressibility of the tablets of about 45 to 50 kg./cm.$^2$ under the aforementioned test. On the contrary, the treated sulphur, with which there is found practically no more formation of harmful lumps, results in figures which are smaller than or equal to 20 kg./cm.$^2$ It can be considered that the anti-lumping agents of medium efficiency give a powder with a compressibility of 21 to 30 kg./cm.$^2$, while figures of 31 to 40 are found with less efficient agents.

In a first series of tests, the results of which are set out in the following Table I, the different additives were used in the proportion of 0.2% by weight; they were mixed for 10 minutes with the mass of molten sulphur at 130°–140° C., stirred with a blade-type stirrer device rotating at 500 r.p.m. After cooling, the crystallised sulphur was crushed in known manner and the fractions with dimensions smaller than 0.063 mm. were separated out for the test.

TABLE I

| Agent tested | Compressibility kg./cm.$^2$ | Observations on the powder obtained |
|---|---|---|
| Oleic acid | 17 | Soft or yielding to the touch; faint odour. |
| Naphthenic acid | 17 | Yielding; strong odour. |
| Fatty acids of tall oil | 17 | Yielding; faint odour. |
| 90% fatty acids of tall oil plus 10% of resinic acids. | 16 | Do. |
| 70% fatty acids of tall oil plus 30% of resinic acids | 14 | Do. |
| 50% fatty acids of tall oil plus 50% of resinic acids. | 13 | Do. |
| 80% fatty acids of tall oil plus 20% of resinic acids. | 14 | Do. |
| Resinic acids (Colophony) | 25 | Yielding. |
| Stearic acid | 26 | Slightly yielding; faint odour. |
| Benzene-sulphonic acid | 34 | Fairly yielding. |
| Benzoic acid | 44 | Hard to the touch. |
| Oleic nitrile | 19 | Fairly yielding; faint odour. |

As known the main component of wood rosin (colophony) is abietic acid.

It can be seen from Table I that mixtures of organic acids of high molecular weight originating from wood, particularly mixtures of tall oil acids with colophony, lead to excellent results, characterised by compressibility values of 13 to 16 kg./cm.$^2$.

As regards colophony by itself (25 kg./cm.$^2$), its solubility in the molten sulphur is lower than 0.2%; there is in fact only a partial dissolution in the test related to Table I. The same applies as regards stearic, benzoic and benzene-sulphonic acids.

Tests carried out with 0.1% by weight of fatty acids of tall oil and their mixtures with resinic acids have given the same results as with 0.2%.

In another series of tests, 0.2% of a mixture comprising 70% of tall oil fatty acids with 30% of resinic acids was dissolved in molten sulphur between 130° and 140° C., with variation in the speed and the period of agitation of the mixture at this temperature. Table II as given below shows that the anti-lumping effect which is obtained does not vary much with these factors.

TABLE II

| Agitation of the mixture | | Compressibility, kg./cm.$^2$ |
|---|---|---|
| Duration, minutes | Speed, r.p.m. | |
| 1 | 500 | 14 |
| 5 | 500 | 14 |
| 1 | 200 | 14 |
| 5 | 200 | 14 |
| 10 | 200 | 15 |
| 0.5 | 1,000 | 13 |
| 1 | 1,000 | 15 |
| 5 | 1,000 | 14 |
| 10 | 1,000 | 15 |

Tests similar to those of Table I were carried out with the same additives thoroughly admixed to pulverulent sulphur instead of molten sulphur; the proportion of additive was in each case 0.35% by weight of sulphur. The powder was thoroughly mixed with the additive during about 30 minutes; the compressibility tests then made with the mixture gave the same results as those of Table I.

Some tests with variable proportions of additive, incorporated to sulphur powder and on the other hand to molten sulphur, lead to the following results set forth in Table III.

TABLE III

| | Powder of sulphur | | Molten sulphur | | |
|---|---|---|---|---|---|
| Percent by weight of additive | 0.2 | 0.35 | 0.02 | 0.05 | 0.1 | 1.0 |
| Compressibilities with— | | | | | | |
| Oleic acid | 18 | 15 | 27 | | 19 | 26 |
| Fatty acids of tall oil | 17 | 15 | 27 | | 17 | 18 |
| 70% fatty acids of tall oil plus 30% resinic acids | 12 | 14 | | 18 | 14 | |
| Oleic nitrile | 30 | 26 | 33 | 27 | 15 | 22 |

We claim:

1. A process for preventing sulphur powder from forming lumps which consist in adding to the sulphur an anti-lumping agent in an amount within the range from 0.1 to 0.3% by weight and consisting of a mixture of tall oil fatty acids and resinic acids and thoroughly mixing the agent with the sulphur.

2. A process as recited in claim 1, wherein said mixture is made up of 70 to 90% of tall oil fatty acids and 30 to 10% of resinic acids.

3. A process for preventing sulphur powder from forming lumps which consist in adding to molten sulphur maintained at a temperature between 125° and 150° C. An anti-lumping agent selected from the class consisting of caproic, caprylic, capric, lauric, oleic, ricinoleic, linoleic, linolenic, stearic, palmitic, abietic, dehydrobietic, tall oil, benzene-sulphonic, dodecyl-phenyl-sulphonic, oleylphenyl-sulphonic, naphthenic acids, and their corresponding nitriles in an amount between 0.05 and 0.5% by weight and thoroughly mixing the agent with the molten sulphur.

4. A process for preventing sulphur powder from forming lumps which consist in adding to molten sulphur maintained at a temperature between 125° and 150° C. an anti-lumping agent in an amount within the range from 0.1 to 0.3% by weight which consists of a mixture of tall oil fatty acids and resinic acids and thoroughly mixing the agent with the sulphur.

5. A process as recited in claim 4, wherein said mixture consists of 70 to 90% of tall oil fatty acids and 30 to 10% of resinic acids.

References Cited by the Examiner

UNITED STATES PATENTS

| 2,069,568 | 2/1937 | Wieder | 23—224 |
| 2,069,710 | 2/1937 | Missbach | 23—224 X |
| 2,080,408 | 5/1937 | Ceccon | 23—224 |
| 2,080,409 | 5/1937 | Ceccon | 23—224 |

FOREIGN PATENTS 682,051  2/1951  Great Britain.

OSCAR R. VERTIZ, *Primary Examiner.*

A. GREIF, *Assistant Examiner.*